(12) United States Patent
Negulescu

(10) Patent No.: US 8,256,709 B2
(45) Date of Patent: Sep. 4, 2012

(54) AIRCRAFT WITH TAIL PROPELLER-ENGINE LAYOUT

(75) Inventor: Dimitrie Negulescu, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 602 days.

(21) Appl. No.: 12/566,839

(22) Filed: Sep. 25, 2009

(65) Prior Publication Data

US 2010/0155526 A1   Jun. 24, 2010

(30) Foreign Application Priority Data

Dec. 23, 2008   (DE) .......................... 10 2008 062 813

(51) Int. Cl.
*B64D 27/00*   (2006.01)
(52) U.S. Cl. .................. 244/55; 244/54; 244/60; 244/69
(58) Field of Classification Search ................ 244/53 R, 244/54, 55, 56, 60, 66, 65, 69
See application file for complete search history.

(56) References Cited

U.S. PATENT DOCUMENTS

| | | | | |
|---|---|---|---|---|
| 2,025,033 | A * | 12/1935 | Atwood | 244/60 |
| 2,601,194 | A | 6/1952 | Whittle | |
| 2,988,301 | A | 6/1961 | Fletcher | |
| 3,054,577 | A | 9/1962 | Wolf et al. | |
| 3,179,354 | A * | 4/1965 | Alvarez-Calderon | 244/66 |
| 3,229,933 | A | 1/1966 | Kutney | |
| 3,547,380 | A * | 12/1970 | Kappus et al. | 244/55 |
| 4,222,235 | A | 9/1980 | Adamson et al. | |
| 4,456,204 | A * | 6/1984 | Hapke | 244/55 |
| 4,500,055 | A | 2/1985 | Krojer | |
| H2032 | H | 7/2002 | DiPietro, Jr. | |
| 6,477,829 | B1 | 11/2002 | Hunter et al. | |
| 6,688,552 | B2 | 2/2004 | Franchet et al. | |
| 6,792,745 | B2 | 9/2004 | Wojciechowski | |
| 7,107,755 | B2 * | 9/2006 | El Hamel et al. | 244/55 |
| 7,540,450 | B2 * | 6/2009 | Brand et al. | 244/54 |
| 7,581,694 | B2 * | 9/2009 | Guering | 244/53 B |
| 7,752,834 | B2 * | 7/2010 | Addis | 244/60 |
| 7,819,358 | B2 * | 10/2010 | Belleville | 244/55 |
| 7,874,513 | B1 * | 1/2011 | Smith | 244/56 |
| 7,926,760 | B2 * | 4/2011 | Gall et al. | 244/55 |
| 8,011,613 | B2 * | 9/2011 | Belleville | 244/55 |
| 2004/0025493 | A1 | 2/2004 | Wojciechowski | |

(Continued)

FOREIGN PATENT DOCUMENTS

DE   722883   7/1942

(Continued)

OTHER PUBLICATIONS

German Search Report dated Dec. 23, 2008 from counterpart German patent application.

(Continued)

*Primary Examiner* — Christopher P Ellis
(74) *Attorney, Agent, or Firm* — Timothy J. Kilma; Shuttleworth & Ingersoll, PLC

(57) ABSTRACT

An aircraft propeller-engine layout includes at least one engine (10) arranged in a tail (2) of a fuselage (1) of an aircraft and has at least one propeller arrangement, with a shaft of the propeller (6, 7) being connected to a shaft (21) of the engine (10) via at least one transfer shaft (12).

13 Claims, 2 Drawing Sheets

U.S. PATENT DOCUMENTS

Figure 1:
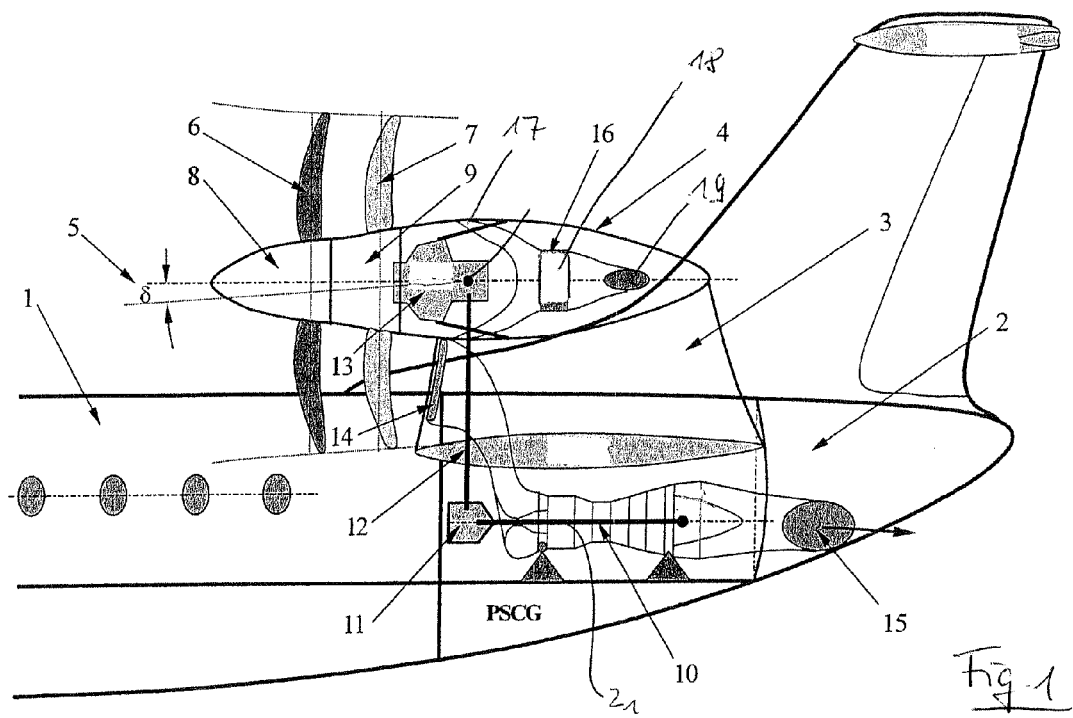

| | | |
|---|---|---|
| 2006/0011780 A1 | 1/2006 | Brand et al. |
| 2007/0051091 A1 | 3/2007 | Rolt |

FOREIGN PATENT DOCUMENTS

| | | |
|---|---|---|
| DE | 23971 | 7/1959 |
| DE | 1264159 | 3/1968 |
| DE | 2831802 | 2/1979 |
| DE | 3219159 | 11/1983 |
| DE | 19840711 | 6/1999 |
| DE | 29916203 | 10/2000 |
| DE | 60206696 | 7/2006 |
| EP | 1331386 | 7/2003 |
| EP | 1637725 | 3/2006 |
| EP | 1916406 | 4/2008 |
| GB | 1249155 | 10/1971 |
| GB | 1554962 | 10/1979 |
| GB | 2356224 | 5/2001 |

OTHER PUBLICATIONS

German Search Report dated Mar. 10, 2009 from related patent application.

European Search Report dated May 2, 2012 from related patent application.

* cited by examiner

AIRCRAFT WITH TAIL PROPELLER-ENGINE LAYOUT

This application claims priority to German Patent Application DE 10 2008 062 813.1 filed Dec. 23, 2008, the entirety of which is incorporated by reference herein.

This invention relates to an aircraft propeller-engine layout, as well as to an aircraft with propeller-engine layout at the tail of the fuselage of the aircraft.

The state of the art describes tail layouts on turboprop aircraft. It is here known to install the engine nacelles of aircraft gas turbines, which are connected to a propeller arrangement in the usual manner, on both sides of the fuselage.

This layout entails considerable disadvantages as the pylons, which carry the engine nacelles and, thus, the engines, are subject to high loads. Also ensuing therefrom is a high weight of the pylons. Due to this installation layout, they have small chord and large installation depth.

Transmission of the required forces necessitates very strong engine suspensions which call for a corresponding structure of the fuselage. All this increases the weight of the aircraft.

The interaction of the wake of the pylon with pusher propellers produces disturbing noise values. Moreover, pusher propellers are arranged in the area of the hot gases/exhaust gases of the aircraft gas turbine. This also leads to an increase in noise emission and, moreover, a reduction of the service life of the propeller blades.

Furthermore, the known designs are disadvantageous in that large and accordingly heavy oil/air cooling devices are required to protect the overall structure of the suspension of the propulsion unit and the control mechanisms for varying the propeller blade pitch against the heat effect of the hot gases.

Moreover, these failure-prone installations involve short operating times between the respective major overhauls specified. All in all, the reliability of such a propulsion system with large, cantilevered and revolving components is inadequate.

It is a broad aspect of the present invention to provide an aircraft propeller-engine layout of the type specified above which, while being simply designed and easily and cost-effectively manufacturable, avoids the disadvantages of the state of the art and, in particular, makes provision for a reduction of the structural measures required and for low sound emission.

According to the present invention, provision is therefore made for a separation of the engine from the propeller arrangement of the aircraft propeller-engine installation. According to the present invention, the engine is situated in the tail area of the fuselage, thereby enabling nacelles or pylons to be dispensed with. According to the present invention, engine power is taken off the engine shaft by use of a transfer shaft and transmitted to a gear drive and further to a propeller shaft of the propeller arrangement.

The present invention accordingly enables the engine to be arranged at a suitable location in the tail of the aircraft fuselage.

The present invention also enables the propeller arrangement to be placed at a favorable location in the tail area of the aircraft fuselage. For example, the propeller arrangement can be disposed in a nacelle connected to the aircraft fuselage via a pylon. This is advantageous in that the nacelle can have a very small cross-section, in essence merely corresponding to the hub cross-section or the hub diameter of the propeller arrangement. The flow conditions resulting therefrom are favorable so that the propeller flow is generally unaffected. Furthermore, the pylon can be of small and aerodynamically favorable size, as it has to carry only the weight of the nacelle of the propeller arrangement.

According to the present invention, it is particularly favorable if the propeller arrangement includes a counter-rotating twin-propeller, but a single propeller (single rotor) may be provided as well.

In a particularly favorable embodiment of the present invention two such propeller arrangements are provided symmetrically to the longitudinal axis of the aircraft. Each of these is driven by its own engine.

In a particularly favorable embodiment of the present invention, it is further provided that the nacelle of the propeller arrangement is swivellable about its transverse axis. Swivelling can be accomplished in a range of ±10°, for example. The propeller thrust vectoring so effected leads to an improvement of the flying characteristics, in particular an optimization of the flying qualities with short running distances and economy of cruise. Setting of the angle can be accomplished hydraulically, for example.

In a favorable development of the present invention, it is provided that in the nacelle a reduction gear drive is arranged which is driven by the transfer shaft and connected to the propeller shaft. The resultant higher speed of the transfer shaft enables the latter to be dimensioned smaller than a shaft running at relatively low speed.

Preferentially, the air inlet of the engine is disposed in the pylons. This provides for an aerodynamically favorable design and reduces the overall size. Furthermore, it can be favorable if the exhaust outlet of the engine is disposed in the tail of the aircraft fuselage and designed, for example, in the form of a nozzle, thereby providing a further propulsive component.

According to the present invention, the propeller arrangement can be provided as tractor-type propeller arrangement (pulling) or as pusher-type propeller arrangement (pushing). This means that the propellers can be arranged upstream or downstream of the nacelle.

As regards the design of the engine, the present invention provides for a multitude of variations. The engine can be provided as aircraft gas turbine, it can be provided in the form of a piston engine or a rotary engine, with other types of propulsion, for example a nuclear reactor, also falling within the scope of the present invention.

Figure 2:
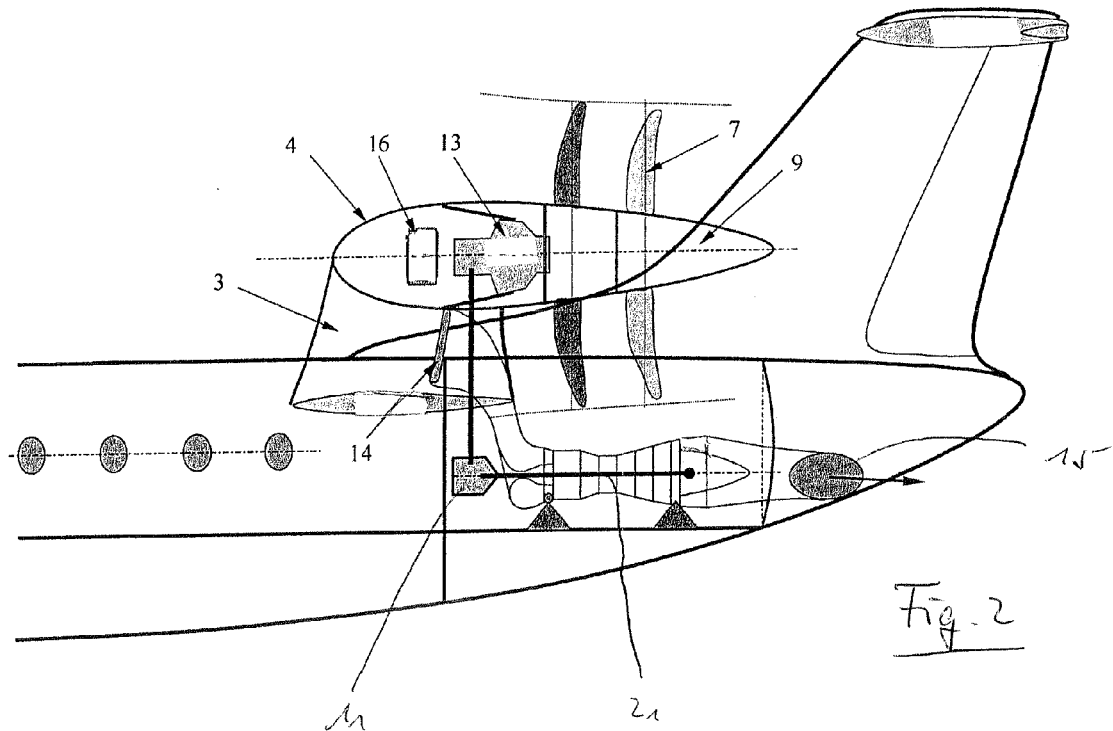
Figure 3:
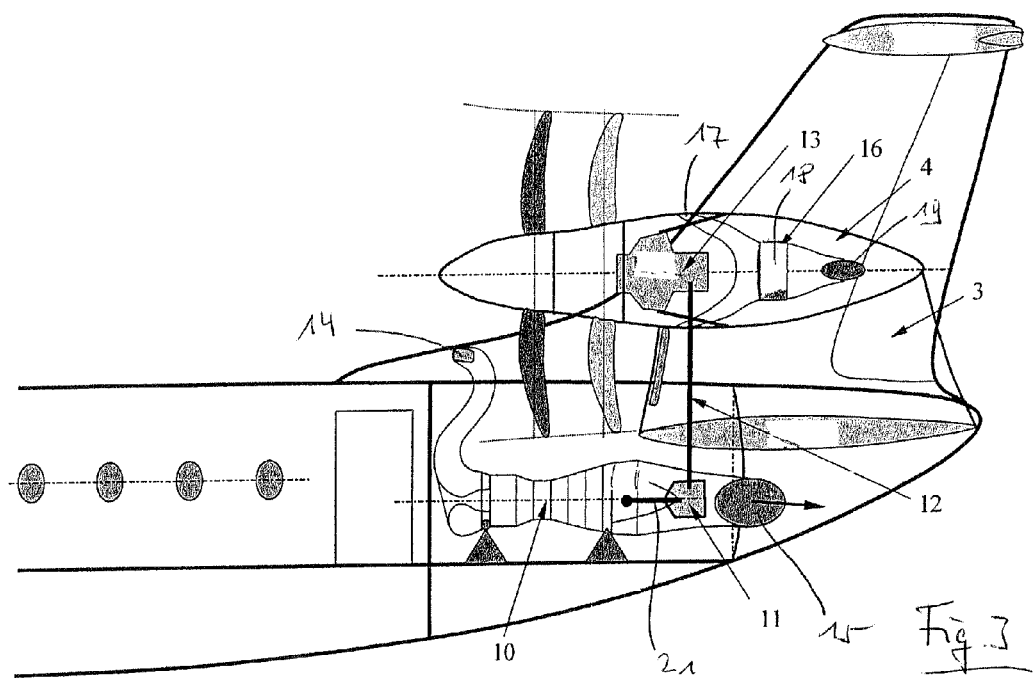
Figure 4:
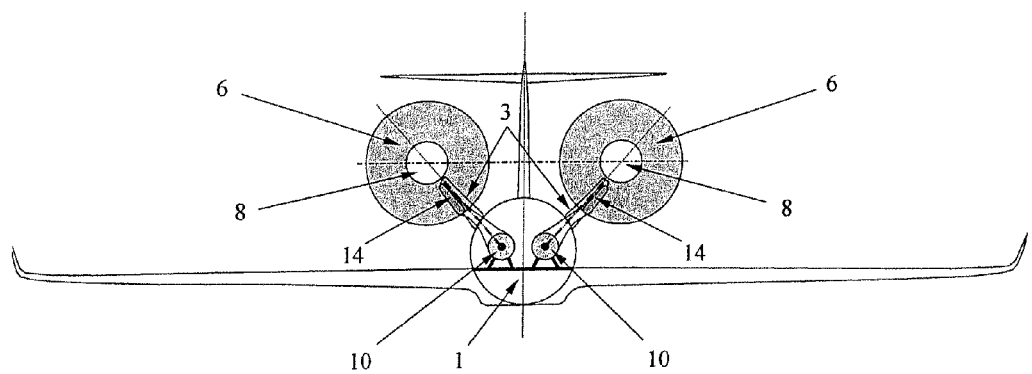

The present invention is more fully described in light of the accompanying drawing showing preferred embodiments. In the drawing, FIG. 1 shows a schematic side view of a first exemplary embodiment of the present invention in tractor-type propeller arrangement, FIG. 2 is a representation, analogically to FIG. 1, in pusher-type propeller arrangement, FIG. 3 shows an arrangement, analogically to FIG. 3, of a further design variant, and FIG. 4 is a simplified partial frontal view of an aircraft designed in accordance with the present invention.

In the different exemplary embodiments, identical parts are designated with the same reference numerals.

Firstly, the figures show a rearward area of an aircraft fuselage 1 with an aircraft tail 2. Analogically to the representation in FIG. 4, two sideward pylons 3 are arranged at the aircraft tail which in a preferred embodiment are angularly disposed. These carry the nacelles 4.

The respective nacelle 4 locates a propeller arrangement which in the exemplary embodiments here shown includes a forward propeller 6 and a rearward propeller 7 rotating in opposite directions. Associated to the propellers is a forward hub 8 and a rearward hub 9, respectively.

The two propeller shafts not shown are each connected to a propeller reduction gear drive 13 arranged in the nacelle 4.

FIG. 1 shows an exemplary embodiment in which the power turbine shaft 21 is forwardly extended and drives a transfer shaft 12 via a bevel gear drive 11. Hence, a tractor-type propeller arrangement is shown in which the shaft of the gas turbine is extended forwards.

Contrarily, FIG. 3 shows an exemplary embodiment in which, on a tractor-type propeller arrangement, the turbine shaft is extended directly rearwards and connected to the bevel gear drive.

The figures further show an oil system 16 of the propeller unit with an air inlet 17, a cooler 18 and an air outlet 19. This is shown in particular in FIGS. 1 and 3, with FIG. 2 providing an only schematic representation of the oil system.

FIG. 1 schematically shows that the entire nacelle 4 is swivellable, allowing the inclination angle δ of the propeller axis to the aircraft axis to be varied. The inclination angle δ can be ±10°. Swivelling is preferably accomplished about the transverse axis of the nacelle, with this axis being vertical to a longitudinal axis defined by the propeller axis. In the exemplary embodiment shown (see FIG. 4), swivelling or rotation is accomplished about the axis of the transfer shaft 12. In this respect, FIG. 1 only shows the inclination angle δ projected into the illustration plane.

FIGS. 1 to 3 further show two turboshaft engines 10 in the form of an aircraft gas turbine mounted in the aircraft tail 2. According to FIG. 4, two such turboshaft engines are provided, each of which driving one of the propeller arrangements.

The turboshaft engine 10 has an engine shaft 21 which is connected to a transfer shaft 12 via a bevel gear drive 11. This transfer shaft 12 in turn is connected to the propeller reduction gear drive 13.

According to the present invention, the transmission of power from engine 10 can be accomplished mechanically, as shown in the figures. However, an electric type of drive coupling with a generator or a motor can also be provided. Alternatively also possible is a hydraulic type of drive coupling with pump and turbine and associated hydraulic circuitry.

The figures further show an engine intake 14 (air inlet) and an engine nozzle 15 (exhaust gas outlet). The engine intake (air inlet) 14 is provided preferably in the forward flow area of the pylons 3.

The present invention provides for different configurations of the propellers. The exemplary embodiments show contra-rotating propellers, but single propellers (single rotor propellers) or propfans can also be provided, independently of the design flight mach number. Accordingly, turbopropellers for applications at Mn<0.5 or also propfans for applications at Mn>0.5 can be provided.

The present invention is characterized by high reliability and lightweight suspension by the pylons 3. This results in low installation resistance. According to the present invention, provision is made for a considerable reduction of sound emission. Thrust vectoring by rotation about the axis of the shaft 12 enables the flight cycle to be optimized, thereby giving rise to environmental aspects.

LIST OF REFERENCE NUMERALS

1 Aircraft fuselage
2 Aircraft tail
3 Pylons
4 Nacelle
5 Angle of incidence of propeller axis to aircraft axis
6 Forward propeller
7 Rearward propeller
8 Forward hub
9 Rearward hub
10 Turboshaft engine/aircraft gas turbine
11 Bevel gear drive
12 Transfer shaft
13 Propeller reduction gear drive
14 Engine intake/air inlet
15 Engine nozzle/exhaust gas outlet
16 Oil system of propeller unit
17 Air inlet
18 Cooler
19 Air outlet
21 Engine shaft

What is claimed is:

1. An aircraft propeller-engine layout, comprising:
    an aircraft having a fuselage, the fuselage having a tail;
    first and second engines, each having a driving shaft, each engine being positionable in a tail of a fuselage of an aircraft;
    first and second propeller shafts;
    one propeller arrangement attached to each propeller shaft;
    first and second transfer shafts connecting the first and second propeller shafts respectively to the driving shafts of the first and second engines;
    wherein each propeller arrangement is disposed in a nacelle, connected to the fuselage of the aircraft via at least one pylon;
    wherein each pylon includes an air inlet for at least one of the first and second engines, the air inlet being remote from the first and second engines positionable in the tail of the fuselage of the aircraft;
    wherein an exhaust gas outlet of each of the first and second engines is arranged in the tail of the aircraft fuselage;
    and further comprising a reduction gear drive arranged in each nacelle, which is driven by one of the first and second shafts and connected to one of the first and second propeller shafts.

2. The layout of claim 1, wherein the propeller arrangement includes a counter-rotating twin-propeller.

3. The layout of claim 1, wherein the propeller arrangement includes a single propeller.

4. The layout of claim 1, wherein the nacelle can be swiveled about its transverse axis.

5. The layout of claim 2, wherein the propeller shaft is a coaxial shaft.

6. The layout of claim 1, wherein the propeller arrangement is a tractor-type propeller arrangement.

7. The layout of claim 1, wherein the propeller arrangement is a pusher-type propeller arrangement.

8. The layout of claim 1, wherein the engine is an aircraft gas turbine.

9. The layout of claim 1, wherein the engine is a piston engine.

10. The layout of claim 1, wherein the engine is a rotary engine.

11. The layout of claim 1, wherein the engine includes a nuclear reactor.

12. The layout of claim 1 and further comprising the aircraft.

13. The layout of claim 12 and further comprising two aircraft-engine layouts symmetrically arranged to a longitudinal axis of the aircraft.

* * * * *